(12) United States Patent
Li et al.

(10) Patent No.: US 10,495,908 B2
(45) Date of Patent: Dec. 3, 2019

(54) DISPLAY DEVICE WITH ADJUSTABLE CURVATURE

(71) Applicant: SHENZHEN CHINA STAR OPTOELECTRONICS TECHNOLOGY CO., LTD., Shenzhen (CN)

(72) Inventors: Jiaxin Li, Shenzhen (CN); Chengling Lv, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 291 days.

(21) Appl. No.: 15/525,063

(22) PCT Filed: Feb. 13, 2017

(86) PCT No.: PCT/CN2017/073338
§ 371 (c)(1),
(2) Date: May 7, 2017

(87) PCT Pub. No.: WO2018/129783
PCT Pub. Date: Jul. 19, 2018

(65) Prior Publication Data
US 2019/0155086 A1 May 23, 2019

(30) Foreign Application Priority Data

Jan. 13, 2017 (CN) .......................... 2017 1 0024780

(51) Int. Cl.
*G02F 1/1333* (2006.01)
*G02F 1/13* (2006.01)
(Continued)

(52) U.S. Cl.
CPC ...... *G02F 1/133305* (2013.01); *G02F 1/1323* (2013.01); *G02F 1/133308* (2013.01);
(Continued)

(58) Field of Classification Search
CPC .................................................. G02F 1/133305
See application file for complete search history.

(56) References Cited

U.S. PATENT DOCUMENTS

2013/0155655 A1* 6/2013 Lee ........................ H05K 5/03
362/97.1
2014/0226266 A1* 8/2014 Kang .................. H01L 51/0097
361/679.01
(Continued)

FOREIGN PATENT DOCUMENTS

CN         103943031     *  7/2014   ............... G09F 9/00

*Primary Examiner* — Sang V Nguyen
(74) *Attorney, Agent, or Firm* — JMB Davis Ben-David

(57) ABSTRACT

A display device with a adjustable curvature is described. The display device includes a display module, a base body, a fixing portion, and two adjusting portions. The fixing portion is configured to fasten the display module to a center of the base body. The two adjusting portions symmetrically disposed on two sides of a back portion of the display module respectively so that the ejector pin moves toward the display module 101 and the display module 101 relative to the intermediate region of the side regions moves forward, thereby forming a curved surface module. The present invention provides a curved television for appropriately adjusting the curvature of the display module at the time of viewing, so as to obtain a better display effect.

16 Claims, 3 Drawing Sheets

(51) Int. Cl.
*G09G 3/34* (2006.01)
*G09F 9/30* (2006.01)
*H04N 5/64* (2006.01)

(52) U.S. Cl.
CPC .............. *G09F 9/301* (2013.01); *G09G 3/34* (2013.01); *H04N 5/64* (2013.01); *G09G 2380/02* (2013.01)

(56) References Cited

U.S. PATENT DOCUMENTS

| | | | |
|---|---|---|---|
| 2014/0354519 A1* | 12/2014 | Lee .................. | G09F 9/301 345/76 |
| 2015/0092361 A1* | 4/2015 | Cho .................. | H02K 7/00 361/749 |
| 2015/0296641 A1* | 10/2015 | Song ............... | H05K 5/0217 361/679.01 |
| 2016/0028042 A1* | 1/2016 | Lee ................. | G02F 1/133305 361/749 |
| 2016/0054512 A1* | 2/2016 | Zhou ............... | G02B 6/0068 362/613 |
| 2016/0156871 A1* | 6/2016 | Liu ................. | G06F 1/1601 348/836 |
| 2017/0092404 A1* | 3/2017 | Sai .................. | H01L 41/12 |

\* cited by examiner

DISPLAY DEVICE WITH ADJUSTABLE CURVATURE

CROSS-REFERENCE TO RELATED APPLICATIONS

This is the U.S. National Stage of International Patent Application No. PCT/CN2017/073338, filed Feb. 13, 2017, which in turn claims the benefit of China Patent Application No. 201710024780.7, filed Jan. 13, 2017.

BACKGROUND OF THE INVENTION

Field of Invention

The present invention relates to a technical field of a liquid crystal display, and more particularly to a display device with an adjustable curvature.

Description of Prior Art

With the development of display technology, an emerging surface television at present has become a popular trend, where the curved surface of the arc-shaped design of the screen of the television and a wide panorama image can be provided, so that it can bring about the same visual enjoyment with the effect at either the center or the periphery of the screen. In addition, when the user views at a close range, the degree of distortion of the off-axis viewing can be reduced to provide better viewing experience. However, if the factors of different room area size and viewing distance are taken into account, a fixed curvature of television simply cannot meet the optimal viewing effect.

In summary, the curvature of curved television in the prior art at the factory has been given so as not to set the curvature adjustment to achieve an optimum viewing effect according to the actual viewing environment.

SUMMARY OF THE INVENTION

Therefore, one objective of the present invention is to provide a display device with an adjustable curvature for adjusting the curvature while watching the television. The curvature of curved television in the prior art at the factory has been given so as not to set the curvature adjustment to achieve an optimum viewing effect according to the actual viewing environment.

Based on the above objective, the present invention sets forth the following technical solutions.

The present invention provides a display device with an adjustable curvature according to one embodiment. The display device comprises a display module; a base body configured to support the display module; a fixing portion disposed on the base body and disposed at a center of a upper side of the base body, for fastening a bottom of the display module to the base body; and at least two adjusting portions symmetrically disposed on two sides of a back portion of the display module respectively, and each adjusting portion comprising a cam mechanism and an ejector pin mechanism; wherein the cam mechanism comprises: a rotating shaft vertically disposed on the upper side of the base body, wherein a bottom end of the rotating shaft is connected to a motor to drive the rotating shaft; and a cam having an eccentric hole thereon, wherein the cam is fastened to a top end of the rotating shaft by the eccentric hole thereon; wherein the ejector pin mechanism comprises: a support plate disposed between the cam and the display module, wherein a top of the support plate is suspended in the air, a bottom of the support plate is fixed to a surface of the base body, and the support plate is bent to back portion of the display module; and an ejector pin disposed on a upper side of the support plate at a same height of the support plate, wherein the ejector pin is perpendicular to the back portion of the display module, a gasket is formed at one end of the ejector pin toward the cam, and one end of the ejector pin which contacts the display module comprises an anti-skid sleeve; wherein a length between an end of the cam and the eccentric hole is greater than a length between the ejector pin and the eccentric hole, and the end of the cam is away from the eccentric hole. In another embodiment, a length between an end of the cam and the eccentric hole is equal to a length between the ejector pin and the eccentric hole, and the end of the cam is away from the eccentric hole. In still another embodiment, a length between an end of the cam and the eccentric hole is less than a length between the ejector pin and the eccentric hole, and the end of the cam is away from the eccentric hole.

In one embodiment, the fixing portion comprises a concave-shaped fixing part, a bottom of the concave-shaped fixing part is fastened to the base body, a bottom of the display module is clamped to a recess of the concave shaped fixing part, and a tightening nut disposed in a back portion of the concave-shaped fixing part is configured to fix the display module to the concave-shaped fixing part.

In one embodiment, the base body is fixedly provided with a bearing, the motor is disposed at the bottom of the base body, and the bottom end of the rotating shaft passes through the bearing to be connected to the output end of the motor.

In one embodiment, a circular protrusion is formed at the top portion of the rotating shaft, the circular protrusion is sleeved in the eccentric hole of the cam, an outer surface of the circular protrusion comprises a convex portion, and the eccentric hole comprises a cavity so that the convex portion is disposed in the cavity.

In one embodiment, a ridge-shaped protrusion is formed at the top portion of the rotating shaft, and a prism-shaped hole is formed in the eccentric hole so that the ridge-shaped protrusion is sleeved in the eccentric hole.

In one embodiment, the cam mechanism further comprise a locking device, the locking device comprises a narrow top and a wide bottom of a sleeve, two ends of the sleeve is a polygonal opening shape, a side surface of the rotating shaft is formed with a plurality of edge surfaces, the sleeve is movably sleeved on the rotating shaft, an opening at the upper end of the sleeve and the side edges of the rotating shaft are matched. A prism-shaped mating portion is disposed on the upper side of the base body. An opening of the bottom end of the sleeve can be sleeved on the prism-shaped mating portion to be fixed.

In one embodiment, a yield strength of a back plate of the display module has a range from 300 to 400 MPa.

In one embodiment, the display module is a liquid crystal display module.

In one embodiment, the display module is a display module with an organic light-emitting diode.

The present invention provides a display device with an adjustable curvature according to another embodiment. The display device comprises a display module; a base body configured to support the display module; a fixing portion symmetrically disposed on the base body and disposed at a center of a upper side of the base body, for fastening a bottom of the display module to the base body; and at least two adjusting portions disposed on two sides of a back portion of the display module respectively, and each adjusting portion comprising a cam mechanism and an ejector pin mechanism; wherein the cam mechanism comprises: a rotating shaft vertically disposed on the upper side of the base body, wherein a bottom end of the rotating shaft is connected to a motor to drive the rotating shaft; and a cam having an eccentric hole thereon, wherein the cam is fastened to a top end of the rotating shaft by the eccentric hole thereon; wherein the ejector pin mechanism comprises: a support plate disposed between the cam and the display module, wherein a top of the support plate is suspended in the air, a bottom of the support plate is fixed to a surface of the base body, and the support plate is bent to back portion of the display module; and an ejector pin disposed on a upper side of the support plate at a same height of the support plate, wherein the ejector pin is perpendicular to the back portion of the display module, and a gasket is formed at one end of the ejector pin toward the cam; wherein a length between an end of the cam and the eccentric hole is greater than a length between the ejector pin and the eccentric hole, and the end of the cam is away from the eccentric hole.

In one embodiment, the fixing portion comprises a concave-shaped fixing part, a bottom of the concave-shaped fixing part is fastened to the base body, a bottom of the display module is clamped to a recess of the concave shaped fixing part, and a tightening nut disposed in a back portion of the concave-shaped fixing part is configured to fix the display module to the concave-shaped fixing part.

In one embodiment, the base body is fixedly provided with a bearing, the motor is disposed at the bottom of the base body, and the bottom end of the rotating shaft passes through the bearing to be connected to the output end of the motor.

In one embodiment, a circular protrusion is formed at the top portion of the rotating shaft, the circular protrusion is sleeved in the eccentric hole of the cam, an outer surface of the circular protrusion comprises a convex portion, and the eccentric hole comprises a cavity so that the convex portion is disposed in the cavity.

In one embodiment, a ridge-shaped protrusion is formed at the top portion of the rotating shaft, and a prism-shaped hole is formed in the eccentric hole so that the ridge-shaped protrusion is sleeved in the eccentric hole.

In one embodiment, the cam mechanism further comprise a locking device, the locking device comprises a narrow top and a wide bottom of a sleeve, two ends of the sleeve is a polygonal opening shape, a side surface of the rotating shaft is formed with a plurality of edge surfaces, the sleeve is movably sleeved on the rotating shaft, an opening at the upper end of the sleeve and the side edges of the rotating shaft are matched. A prism-shaped mating portion is disposed on the upper side of the base body. An opening of the bottom end of the sleeve can be sleeved on the prism-shaped mating portion to be fixed.

In one embodiment, a yield strength of a back plate of the display module has a range from 300 to 400 MPa.

In one embodiment, the display module is a liquid crystal display module.

In one embodiment, the display module is a display module with an organic light-emitting diode.

The present invention has the following beneficial effects. In comparison with the conventional surface of television, the present invention provides a curved television for appropriately adjusting the curvature of the display module at the time of viewing, so as to obtain a better display effect.

BRIEF DESCRIPTION OF THE DRAWINGS

The following embodiments refer to the accompanying drawings for exemplifying specific implementable embodiments of the present invention.

DETAILED DESCRIPTION OF THE PREFERRED EMBODIMENTS

Figure 1:
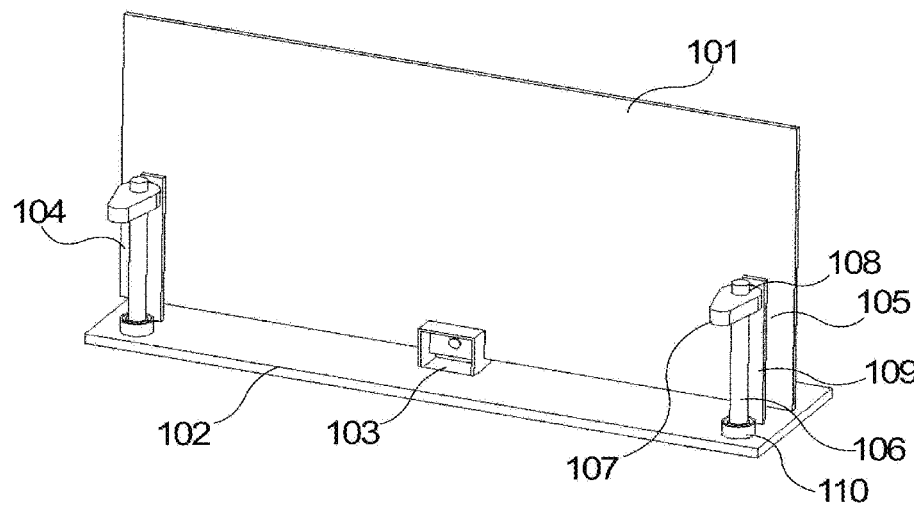
FIG. 1 is an illustrative structural view of a display device according to one embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

The present invention is directed to a technical problem of a television, an existing surface curvature which has been set at the factory, according to the actual viewing environment so as not to adjust the curvature of the television and further affect the viewing effect. The present invention can solve the above problem.

FIG. 1 is an illustrative structural view of a display device according to one embodiment of the present invention.

As shown in FIG. 1, the present invention provides a display device according to one embodiment. The display device includes a display module 101, a base body 102, a fixing portion 103, a first adjusting portion 104 and a second adjusting portion 105. In FIG. 1, the display module 101 is in a planar module state, where the display module 101 can be bent at a predetermined angle. The display module 101 includes high yield strength of the material of the back plate so that the display module 101 can be restored from a curved state to a planar state. In one embodiment, the yield strength of the back plate of the display module 101 has a range from 300 to 400 MPa.

The fixing portion 103 is disposed at the center of the upper side of the base body 102. The bottom of the display module 101 is disposed on the upper side of the base body 102 by using the fixing portion 103. The first adjusting portion 104 and the second adjusting portion 105 are symmetrically disposed on the upper side of the base body 102. The first adjusting portion 104 and the second adjusting portion 105 are disposed on the two sides of the back portion of the display module 101 respectively.

The fixing portion 103 includes a concave-shaped fixing part. The bottom of the concave-shaped fixing part is fastened to the base body 102. In one embodiment, the bottom of the display module 101 is clamped to the recess of the concave shaped fixing part, where a tightening nut disposed in the back portion of the concave-shaped fixing part is configured to fix the display module 101 to the concave-shaped fixing part.

The first adjusting portion 104 and the second adjusting section 105 include a cam mechanism and an ejector pin mechanism.

The cam mechanism includes a rotating shaft 106, a cam 107, and a motor (not shown).

The cam 107 includes a large circular arc end and a relatively small arc end. Two end sides of the large arc end and two end sides of the small circular arc are connected to form a bevel. The cam 107 includes an eccentric hole 108. The eccentric hole 108 is disposed near the large arc end, and the small circular arc end is away from the eccentric hole 108.

The motor is disposed at the bottom of the base body 102. The top end of the shaft 106 is fixed to the eccentric hole 108 therein. The bottom end of the shaft 106 is connected to the output end of the motor. When the motor rotates, the rotating shaft 106 drives the cam 107 so that the cam 107 horizontally rotates at the center (i.e., a rotation axis point) of the eccentric hole 108. The base body 102 is also fixedly provided with a bearing 110, and the shaft 106 is connected to the bearing 110.

For example, a circular protrusion is formed at the top portion of the rotating shaft 106, where the circular protrusion is sleeved in the eccentric hole 108 of the cam 107. The outer surface of the circular protrusion includes a convex portion and the eccentric hole 108 includes a cavity so that the convex portion is disposed in the cavity for limiting the cam 107 to the rotation of the rotating shaft 106. In another example, a ridge-shaped protrusion is formed at the top portion of the rotating shaft 106, and a prism-shaped hole is formed in the eccentric hole 108 so that the ridge-shaped protrusion is sleeved in the eccentric hole 108.

The ejector pin mechanism includes a support plate 109 (e.g., an elastic plate) which is disposed between the cam 107 and the display module 101. The bottom of the support plate 109 is fixed to the surface of the base body 102 and the top of the support plate 109 is suspended in the air. When top of the support plate 109 is pushed, the support plate 109 which is composed of higher yield strength material can be bent to one side so that the support plate 109 can be restored prior to bending after the bending shape is formed. An ejector pin is formed on the upper side of the support plate 109, where one end of the ejector pin is directed to the cam 107, the opposite end of the ejector pin is directed to the display module 101, and the ejector pin is perpendicular to the back portion of the display module 101. The ejector pin is located at the height of the support plate 109 which is the same as the height of the cam 107 so that the small arc end of the cam 107 can abut against the ejector pin.

One end of the ejector pin which contacts the display module 101 includes an anti-skid sleeve to increase a back friction between the top of the ejector pin and the display module 101 so that a force offset is prevented when the ejector pin contact against the display module 101.

In one embodiment, a gasket is formed at one end of the ejector pin toward the cam 107 to increase a contact area between the ejector pin and the cam 107. The support plate 109 includes a fixing hole, where the ejector pin is inserted into the fixing hole, and the ejector pin and the fixing hole is connected by a threaded manner.

Preferably, the cam 107 mechanism further includes a locking device, where the locking device includes a narrow top and a wide bottom of a sleeve, and the two ends of the sleeve is a polygonal opening shape. The side surface of the rotating shaft 106 is formed with a plurality of edge surfaces, where the sleeve is movably sleeved on the rotating shaft 106. The opening at the upper end of the sleeve and the side edges of the rotating shaft 106 are matched. A prism-shaped mating portion is disposed on the upper side of the base body 102. An opening of the bottom end of the sleeve can be sleeved on the prism-shaped mating portion to be fixed. After the rotation angle of the cam 107 is selected, the locking device limits the deflection of the cam 107 so as to fix the curvature of the display module 101.

In one embodiment of the present invention, the display module 101 makes a motion by the first adjusting portion 104 and the second adjusting section 105 so that the planar module of the display module 101 is deformed into a curved surface module. As shown in FIG. 1, when the adjusting portion 104 and the second adjusting portion 105 is inactivated, the support plate 109 is not deformed such that the ejector pin has no abutting against the display module 101, and the display module 101 is in a planar module state.

The shaft 106 is driven by a motor to rotate and further drive the cam 107 in a horizontal rotation manner. When the cam 107 is rotated, one end which is away from the eccentric hole 108 contacts against the gasket of the ejector pin, so that the ejector pin moves toward the display module 101 and the display module 101 relative to the intermediate region of the side regions moves forward, thereby forming a curved surface module. The rotation of the cam 107 can change the movement stroke of the ejector pin for adjusting the curvature of the display module 101.

Figure 2:
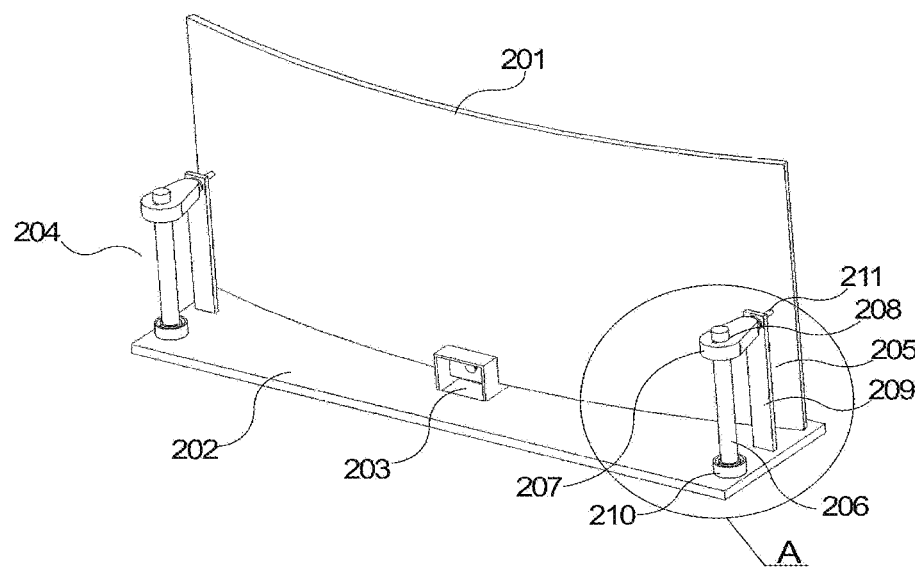
FIG. 2 is an illustrative structural view of a display device according to another embodiment of the present invention.

FIG. 2 is an illustrative structural view of a display device according to another embodiment of the present invention.

As shown in FIG. 2, the display device includes a display module 201, a base body 202, a fixing portion 203, the first adjusting part 204, and the second adjusting part 205, where the display module 201 is in a curved surface module state.

The fixing portion 203 is disposed at the center of the upper side of the base body 202. The bottom of the display module 201 is disposed on the upper side of the base body 202 by using the fixing portion 203. The first adjusting portion 204 and the second adjusting portion 205 are symmetrically disposed on the upper side of the base body 202. The first adjusting portion 204 and the second adjusting portion 205 are disposed on the two sides of the back portions of the display module 201 respectively.

The first adjusting portion 204 and the second adjusting section 205 include a cam mechanism and an ejector pin mechanism.

The cam mechanism includes a rotating shaft 206, a cam 207, and a motor (not shown).

The cam 207 includes an eccentric hole 208. The motor is disposed at the bottom of the base body 202. The top end of the shaft 206 is fixed to the eccentric hole 208 therein. The base body 202 is also fixedly provided with a bearing 210, and the shaft 206 is connected to the bearing 210.

The ejector pin mechanism includes an elastic support plate 209 which is disposed between the cam 207 and the display module 201. The bottom of the support plate 209 is fixed to the surface of the base body 202 and the top of the support plate 209 is suspended in the air. An ejector pin 211 is formed on the upper side of the support plate 209.

The planar module is deformed into a curved surface module. Specifically, the motor operates to drive the rotation of the shaft 206, so as to drive the cam 207, which is fixed to the top end of the shaft 206, to be rotated. When the cam 207 is rotated, the bevel gradually towards the side of the support plate 209 for extrusion, and further forces against the support plate 209 to be bent to the back of the display module 201. The ejector pin 211 which is disposed on the upper side of the support plate 209 moves toward the back of the display module 201, and the ejector pin 211 contacts against the display module 201 so that the regions on both sides of the display module 201 is moving forward relative to the middle region to form a curved surface module. When the cam 207 of the long end (away from the one end of the eccentric hole 208) slides to the end of the ejector pin 211, the ejector pin 211 is moved in a maximum moving distance, and meanwhile, the maximum curvature of the curved surface module is formed.

Figure 3:
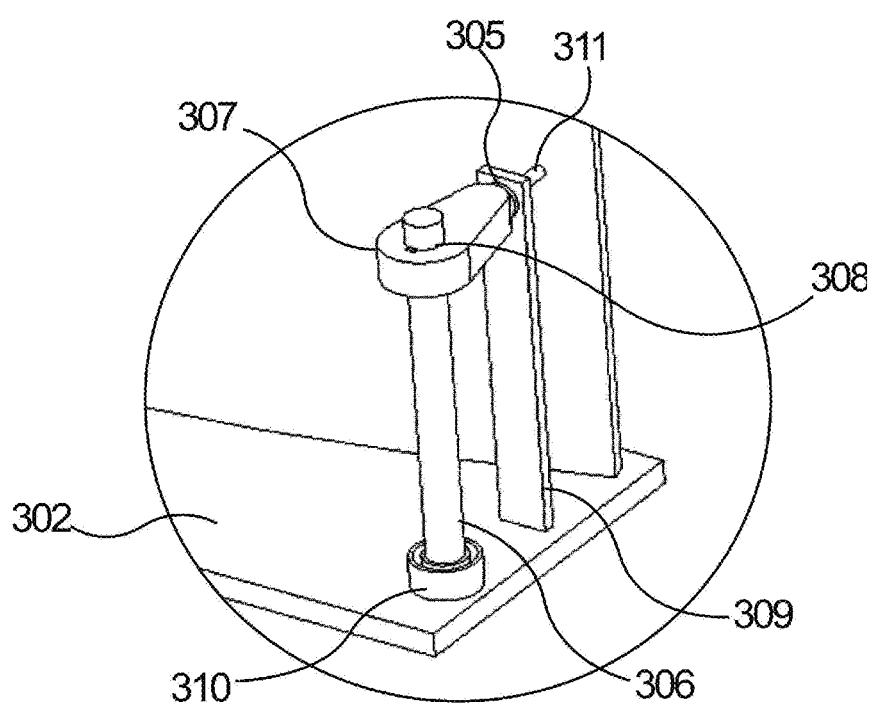
FIG. 3 is an illustrative enlarged view of the display device in a circular region "A" in FIG. 2 according to one embodiment of the present invention.

FIG. 3 is an illustrative enlarged view of the display device in a circular region "A" in FIG. 2 according to one embodiment of the present invention.

As shown in FIG. 3, a cam mechanism and an ejector pin mechanism are depicted.

The cam mechanism includes a rotating shaft 306, a cam 307, and a motor (not shown). The cam 307 includes an eccentric hole 308. The motor is disposed at the bottom of the base body 302. The top end of the shaft 306 is fixed to the eccentric hole 308 therein. The bottom end of the shaft 306 is connected to the output end of the motor. When the motor rotates, the rotating shaft 306 drives the cam 307 so that the cam 307 horizontally rotates at the center (i.e., a rotation axis point) of the eccentric hole 308. The base body 302 is also fixedly provided with a bearing 310, and the shaft 306 is connected to the bearing 310.

The ejector pin mechanism includes an elastic support plate 309. The bottom of the support plate 309 is fixed to the surface of the base body 302 and the top of the support plate 309 is suspended in the air. An ejector pin 311 is formed on the upper side of the support plate 309, where one end of the ejector pin is directed to the cam 307, the opposite end of the ejector pin is directed to the display module 301, and the ejector pin is perpendicular to the back of the display module 301.

In one embodiment, a gasket 305 is formed at one end of the ejector pin 311 toward the cam 307 to increase a contact area between the ejector pin 311 and the cam 307. The support plate 309 includes a fixing hole, where the ejector pin 311 is inserted into the fixing hole, and the ejector pin 311 and the fixing hole is connected by a threaded manner.

The present invention has the following beneficial effects. In comparison with the conventional surface of television, the present invention provides a curved television for appropriately adjusting the curvature of the display module at the time of viewing, so as to obtain a better display effect.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A display device with an adjustable curvature, the display device comprising:
   a display module;
   a base body configured to support the display module;
   a fixing portion disposed on the base body and disposed at a center of a upper side of the base body, for fastening a bottom of the display module to the base body; and
   at least two adjusting portions symmetrically disposed on two sides of a back portion of the display module respectively, and each adjusting portion comprising a cam mechanism and an ejector pin mechanism;
   wherein the cam mechanism comprises:
   a rotating shaft vertically disposed on the upper side of the base body, wherein a bottom end of the rotating shaft is connected to a motor to drive the rotating shaft; and
   a cam having an eccentric hole thereon, wherein the cam is fastened to a top end of the rotating shaft by the eccentric hole thereon;
   wherein the ejector pin mechanism comprises:
   a support plate disposed between the cam and the display module, wherein a top of the support plate is suspended in the air, a bottom of the support plate is fixed to a surface of the base body, and the support plate is bent to back portion of the display module, wherein a yield strength of a back plate of the display module has a range from 300 to 400 MPa; and
   an ejector pin disposed on a upper side of the support plate at a same height of the support plate, wherein the ejector pin is perpendicular to the back portion of the display module, a gasket is formed at one end of the ejector pin toward the cam, and one end of the ejector pin which contacts the display module comprises an anti-skid sleeve;
   wherein a length between an end of the cam and the eccentric hole is greater than a length between the ejector pin and the eccentric hole, and the end of the cam is away from the eccentric hole.

2. The display device with the adjustable curvature of claim 1, wherein the fixing portion comprises a concave-shaped fixing part, a bottom of the concave-shaped fixing part is fastened to the base body, a bottom of the display part is clamped to a recess of the concave shaped fixing part, and a tightening nut disposed in a back portion of the concave-shaped fixing part is configured to fix the display module to the concave-shaped fixing part.

3. The display device with the adjustable curvature of claim 1, wherein the base body is fixedly provided with a bearing, the motor is disposed at the bottom of the base body, and the bottom end of the rotating shaft passes through the bearing to be connected to the output end of the motor.

4. The display device with the adjustable curvature of claim 1, wherein a circular protrusion is formed at the top portion of the rotating shaft, the circular protrusion is sleeved in the eccentric hole of the cam, an outer surface of the circular protrusion comprises a convex portion, and the eccentric hole comprises a cavity so that the convex portion is disposed in the cavity.

5. The display device with the adjustable curvature of claim 1, wherein a ridge-shaped protrusion is formed at the top portion of the rotating shaft, and a prism-shaped hole is formed in the eccentric hole so that the ridge-shaped protrusion is sleeved in the eccentric hole.

6. The display device with the adjustable curvature of claim 1, wherein the cam mechanism further comprises a locking device, the locking device comprises a narrow top and a wide bottom of a sleeve, two ends of the sleeve is a polygonal opening shape, a side surface of the rotating shaft is formed with a plurality of edge surfaces, the sleeve is movably sleeved on the rotating shaft, an opening at the upper end of the sleeve and the side edges of the rotating shaft are matched, wherein a prism-shaped mating portion is disposed on the upper side of the base body, an opening of the bottom end of the sleeve can be sleeved on the prism-shaped mating portion to be fixed.

7. The display device with the adjustable curvature of claim 1, wherein the display module is a liquid crystal display module.

8. The display device with the adjustable curvature of claim 1, wherein the display module is a display module with an organic light-emitting diode.

9. A display device with an adjustable curvature, the display device comprising:

a display module;

a base body configured to support the display module;

a fixing portion symmetrically disposed on the base body and disposed at a center of a upper side of the base body, for fastening a bottom of the display module to the base body; and at least two adjusting portions disposed on two sides of a back portion of the display module respectively, and each adjusting portion comprising a cam mechanism and an ejector pin mechanism;

wherein the cam mechanism comprises:

a rotating shaft vertically disposed on the upper side of the base body, wherein a bottom end of the rotating shaft is connected to a motor to drive the rotating shaft; and a cam having an eccentric hole thereon, wherein the cam is fastened to a top end of the rotating shaft by the eccentric hole thereon;

wherein the ejector pin mechanism comprises:

a support plate disposed between the cam and the display module, wherein a top of the support plate is suspended in the air, a bottom of the support plate is fixed to a surface of the base body, and the support plate is bent to back portion of the display module, wherein a yield strength of a back plate of the display module has a range from 300 to 400 MPa; and an ejector pin disposed on a upper side of the support plate at a same height of the support plate, wherein the ejector pin is perpendicular to the back portion of the display module, and a gasket is formed at one end of the ejector pin toward the cam;

wherein a length between an end of the cam and the eccentric hole is greater than a length between the ejector pin and the eccentric hole, and the end of the cam is away from the eccentric hole.

10. The display device with the adjustable curvature of claim 9, wherein the fixing portion comprises a concave-shaped fixing part, a bottom of the concave-shaped fixing part is fastened to the base body, a bottom of the display module is clamped to a recess of the concave shaped fixing part, and a tightening nut disposed in a back portion of the concave-shaped fixing part is configured to fix the display module to the concave-shaped fixing part.

11. The display device with the adjustable curvature of claim 9, wherein the base body is fixedly provided with a bearing, the motor is disposed at the bottom of the base body, and the bottom end of the rotating shaft passes through the bearing to be connected to the output end of the motor.

12. The display device with the adjustable curvature of claim 9, wherein a circular protrusion is formed at the top portion of the rotating shaft, the circular protrusion is sleeved in the eccentric hole of the cam, an outer surface of the circular protrusion comprises a convex portion, and the eccentric hole comprises a cavity so that the convex portion is disposed in the cavity.

13. The display device with the adjustable curvature of claim 9, wherein a ridge-shaped protrusion is formed at the top portion of the rotating shaft, and a prism-shaped hole is formed in the eccentric hole so that the ridge-shaped protrusion is sleeved in the eccentric hole.

14. The display device with the adjustable curvature of claim 9, wherein the cam mechanism further comprises a locking device, the locking device comprises a narrow top and a wide bottom of a sleeve, two ends of the sleeve is a polygonal opening shape, a side surface of the rotating shaft is formed with a plurality of edge surfaces, the sleeve is movably sleeved on the rotating shaft, an opening at the upper end of the sleeve and the side edges of the rotating shaft are matched, wherein a prism-shaped mating portion is disposed on the upper side of the base body, an opening of the bottom end of the sleeve can be sleeved on the prism-shaped mating portion to be fixed.

15. The display device with the adjustable curvature of claim 9, wherein the display module is a liquid crystal display module.

16. The display device with the adjustable curvature of claim 9, wherein the display module is a display module with an organic light-emitting diode.

* * * * *